M. KRZEWINSKI & M. WOJCIK.
COMBINATION BED, SOFA, AND SWING.
APPLICATION FILED MAY 31, 1910.
1,006,954.
Patented Oct. 24, 1911.
3 SHEETS—SHEET 1.
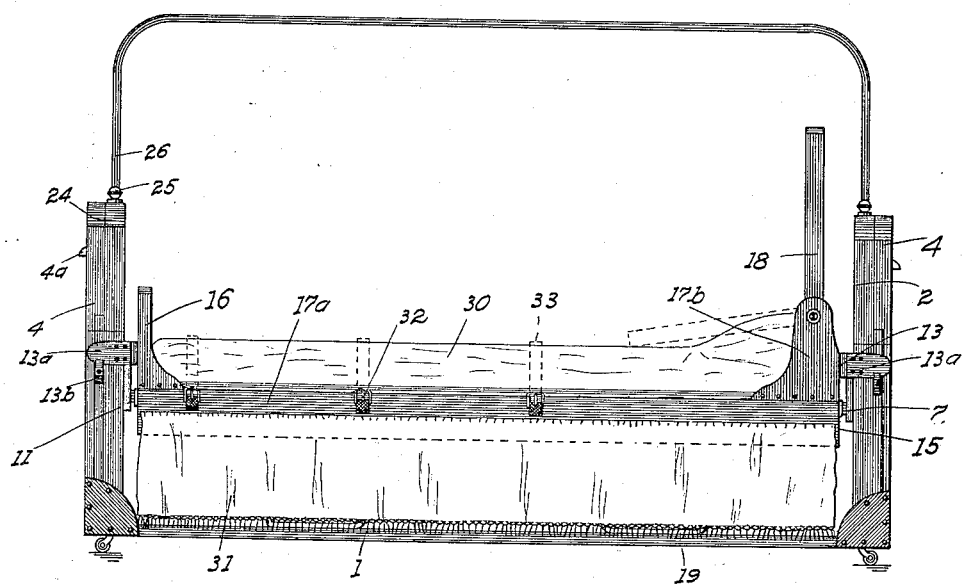
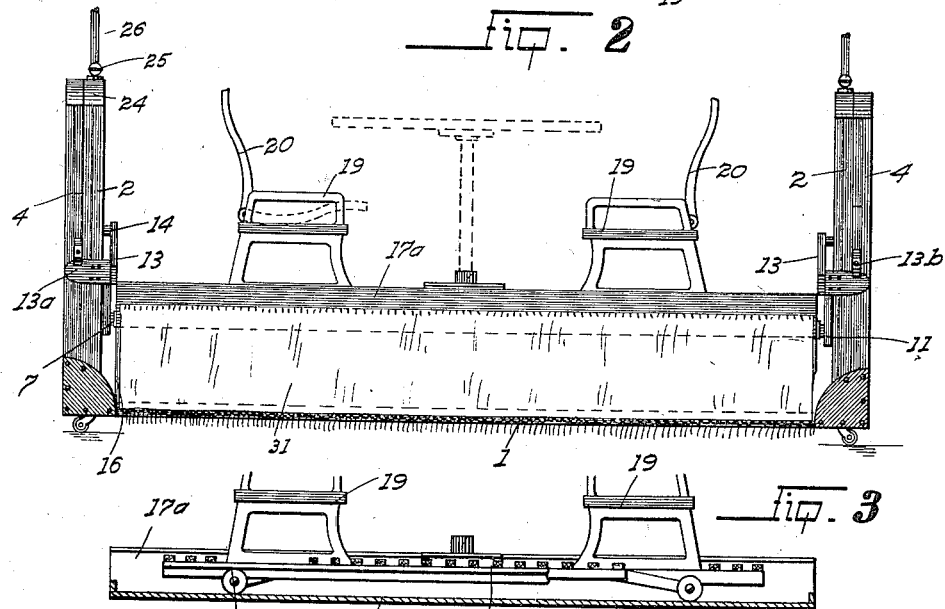
Witnesses
Frank H. Carter
J. B. Webster
Inventors
Mikolaj Krzewinski
and Michael Wojcik
Percy T. Webster
Attorney M. KRZEWINSKI & M. WOJCIK.
COMBINATION BED, SOFA, AND SWING.
APPLICATION FILED MAY 31, 1910.
1,006,954.
Patented Oct. 24, 1911.
3 SHEETS—SHEET 2.
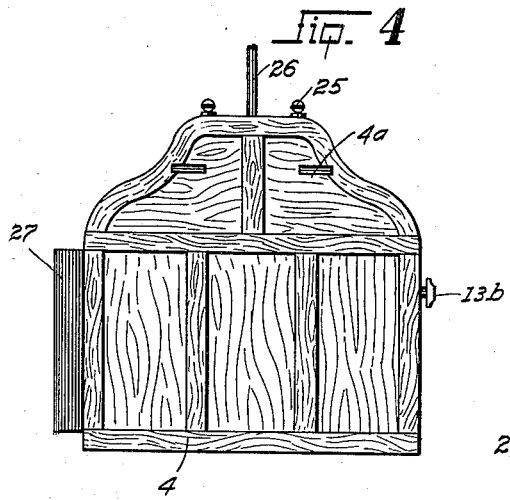
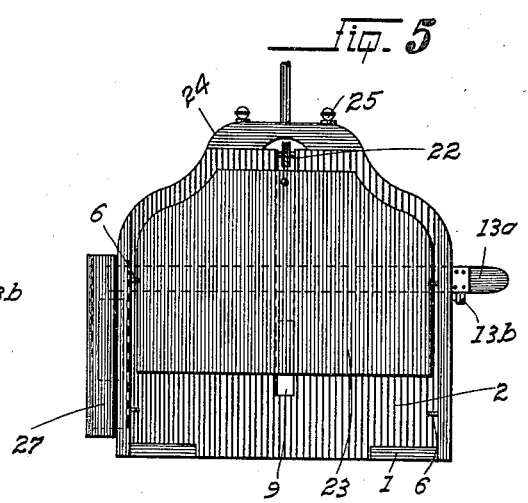
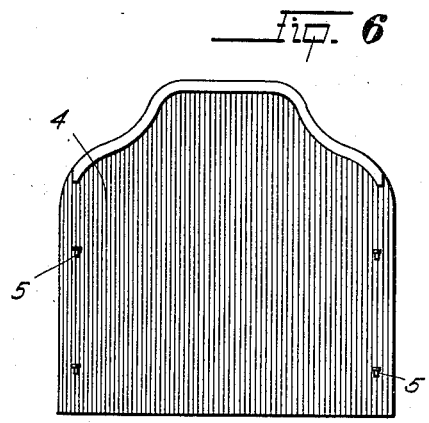
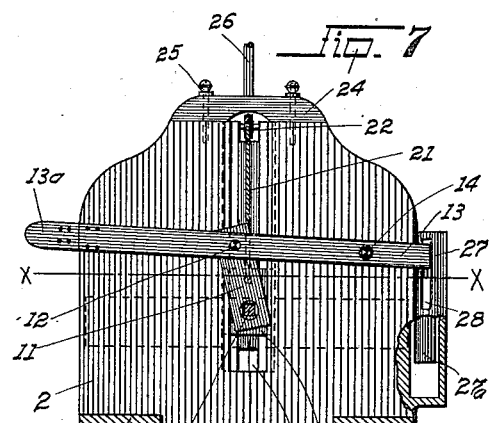
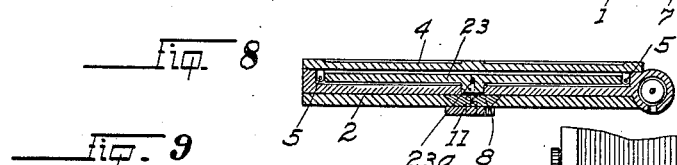
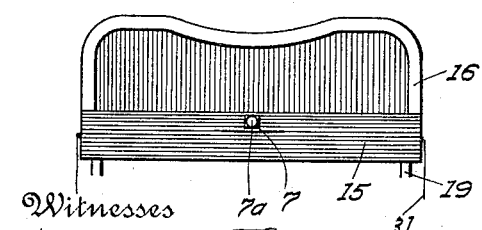
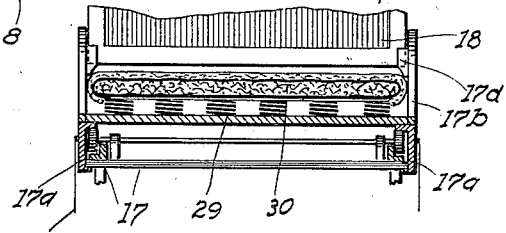
Witnesses
Frank H. Carter
J. F. Webster
Inventors
Mikolaj Krzewinski
and Michael Wojcik
Percy F. Webster
Attorney

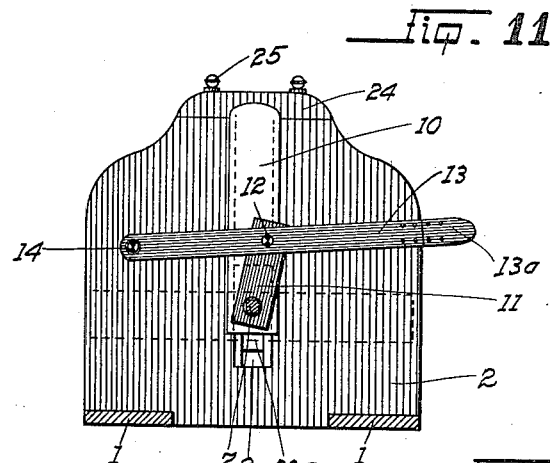
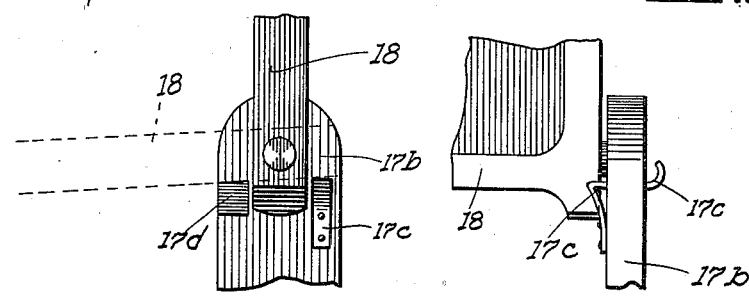
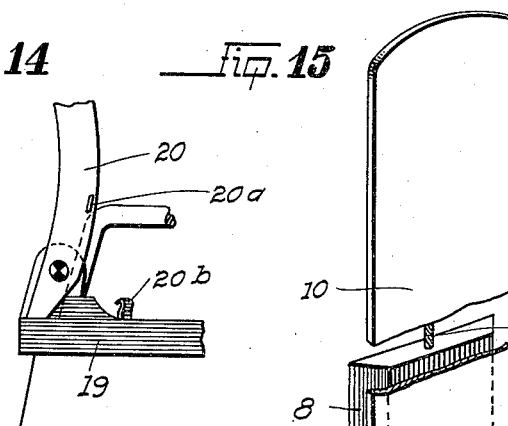
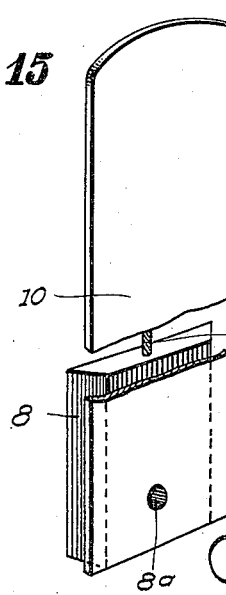
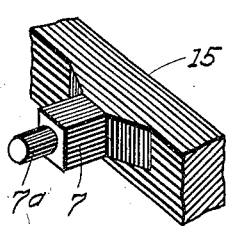

UNITED STATES PATENT OFFICE.

MIKOLAJ KRZEWINSKI AND MICHAEL WOJCIK, OF SACRAMENTO, CALIFORNIA, ASSIGNORS OF ONE-THIRD TO JOHN DONANOWSKI, OF SACRAMENTO COUNTY, CALIFORNIA.

COMBINATION BED, SOFA, AND SWING.

1,006,954.      Specification of Letters Patent.      Patented Oct. 24, 1911.

Application filed May 31, 1910. Serial No. 564,253.

*To all whom it may concern:*

Be it known that we, MIKOLAJ KRZEWINSKI and MICHAEL WOJCIK, citizens of the United States, residing at Sacramento, in the county of Sacramento, State of California, have invented certain new and useful Improvements in Combination Beds, Sofas, and Swings; and we do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in household paraphernalia and particularly to a swing which can be readily convertible into a bed or sofa or vice versa, the object of the invention being to produce a combination furniture which will give the pleasure of the swing and the usefulness of a bed or sofa all in one piece of furniture, the same being designed for house or garden use.

A further object of the invention is to produce a simple and inexpensive device and yet one which will be exceedingly effective for the purposes for which it is designed.

These objects, we accomplish by means of such structure and relative arrangement of parts as will fully appear by a perusal of the following specification and claims.

In the drawings similar characters of reference indicate corresponding parts in the several views.

Figure 1 is a side elevation of the device showing it used as a bed. Fig. 2 is a similar view showing it used as a swing. Fig. 3 is a fragmentary sectional view showing the swing runway. Fig. 4 is a view of the front end of the device. Fig. 5 is a similar view with a paneled covering removed. Fig. 6 is an inside elevation of such covering. Fig. 7 is an inside view of one end of the device. Fig. 8 is a sectional view taken on a line x—x of Fig. 7. Fig. 9 is an outside view of the foot of the bed. Fig. 10 is a cross sectional view of the bed and swing frame. Fig. 11 is an inside view of the end of the device not shown in Fig. 7. Fig. 12 is a fragmentary view showing the end of a retaining spring. Fig. 13 is a similar view showing the side of said retaining spring. Fig. 14 is a fragmentary view showing a spring catch. Fig. 15 is a perspective view showing a guide and slot cover. Fig. 16 is a fragmentary view of a bed support showing a swivel pin thereon.

Referring now more particularly to the characters of reference on the drawing 1 designates the base supporting members of the device and 2 are end boards thereon such boards 2 having paneled end covering members 4 having lifting handles $4^a$ to permit them to be removed by reason of removable pins 5 on the member 4 fitting into eyelets 6 on the member 2.

15 represents two end members having outside projecting square shoulders 7 which fit into swinging arms 11 and thence having pins $7^a$ projecting through holes $8^a$ in cover plates 10 into a guide 8 movable in vertical slots 9 in the members 2, the plates 10 at all times covering the slots 9 and guides 8 from view. From the guides 8 cables 21 run over pulleys 22 to weights 23 movable between the members 2 and 4 while 13 are levers pivoted to the swinging arms 11 as at 12 and fulcrumed to the members 2 as at 14 such levers 13 having offset ends $13^a$ adapted to engage hooks $13^b$ on the members 4, which hold them in normal steady position. Secured between the members 15 is a frame $17^a$ carrying on one side one of the well known and ordinary types of roller swings 17 and on its other side a bed and paraphernalia 30 having springs 39, a foot board 16 and a folding head board 18.

When it is desired to use the device as a swing the head board 18 is folded down as shown by dotted lines in Fig. 1 and snaps under a retaining spring $17^c$ on the stationary base of the foot board $17^b$ which holds it normally closed. Then the levers 13 are operated one at a time one of such levers having a counter balancing weight $27^a$ in a casing 27 having a slot 28 permitting the connection of the weight $27^a$ to the lever 13 and also permitting its vertical movement. This counter balancing weight operates one lever after it is released from the catch $13^b$. Then the other lever 13 is operated by hand, this operation just described coupled with the action of the weights 23 causing the guides 8 to move upward in the slots 9 thus carrying the members 15 and the bed and swings which they carry to be lifted clear of the members 1 and then said members 15 are swung on the pins $7^a$ to turn the bed under and the swings up and then the levers 13 are operated to again lower the members 15 until the ends 16 and 17ᵇ rest on the members 1 which supports the whole device and permits the swing 17 to be used in the usual manner. Vice versa when the bed is to be used the backs 20 of the chairs or seats 19 of the swing 17 are turned down and held by a catch 20ᵇ engaging a lug 20ᵃ and then the turning operation above set forth is repeated to turn the bed up and the swing down, the whole then resting on the arms of the seats 19.

Buckles 32 and straps 33 may be used to hold the bedding 30 in place when the bed is turned under. Curtains or flaps 31 cover the parts which are not in use as shown in Figs. 1, 2 and 9. A brace wire or member 26 may connect the two end members 2 if desired.

17ᵈ represents blocks to hold the head boards 18 in proper vertical position when open.

From the foregoing description it will readily appear that we have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described our invention what we claim as new and useful and desire to secure by Letters Patent is:

1. A device of the character described comprising end boards having movable slots, guides movable in said slots, swinging arms connected with said guides, a horizontal frame turnably mounted in said swinging arms and levers fulcrumed to said end boards and said swinging arms as described.

2. A device of the character described comprising end boards having vertical slots, guides movable in said slots, swinging arms connected with said guides, horizontal frames turnably mounted in said swinging arms, levers fulcrumed to said end boards and said swinging arms and pulling weights connected with said guides as described.

3. A device of the character described comprising end boards provided with vertical slots, guides movable in said slots, a horizontal frame turnably mounted in said guides, levers fulcrumed to said end boards and adapted to be connected with said guides and counterbalancing weights on the ends of said levers as described.

In testimony whereof we affix our signatures in presence of two witnesses.

MIKOLAJ ╳ KRZEWINSKI.
(his mark)

MICHAEL WOJCIK.

Witnesses:
JOSHUA B. WEBSTER,
FRANK H. CARTER.

---

Copies of this patent may be obtained for five cents each, by addressing the "Commissioner of Patents, Washington, D. C."